US007893677B2

(12) United States Patent
Nguyen

(10) Patent No.: US 7,893,677 B2
(45) Date of Patent: Feb. 22, 2011

(54) METHOD AND APPARATUS FOR SYNCHRONOUS BOOST VOLTAGE REGULATORS WITH ACTIVE NEGATIVE CURRENT MODULATION

(75) Inventor: James H. Nguyen, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 386 days.

(21) Appl. No.: 12/057,717

(22) Filed: Mar. 28, 2008

(65) Prior Publication Data
US 2009/0243568 A1 Oct. 1, 2009

(51) Int. Cl.
*G05F 1/575* (2006.01)
(52) U.S. Cl. .................. 323/284; 323/223
(58) Field of Classification Search ......... 323/282–290, 323/272, 276, 222, 223; 363/89, 95, 97, 363/98
See application file for complete search history.

(56) References Cited

U.S. PATENT DOCUMENTS

| 7,180,274 B2 * | 2/2007 | Chen et al. | 323/222 |
| 7,391,199 B2 * | 6/2008 | Akashi et al. | 323/285 |
| 7,557,545 B2 * | 7/2009 | Naka et al. | 323/223 |

\* cited by examiner

*Primary Examiner*—Rajnikant B Patel
(74) *Attorney, Agent, or Firm*—Perkins Coie LLP

(57) ABSTRACT

A switch-mode synchronous boost voltage regulator is disclosed that includes a boost voltage regulator and an active current modulator. The active current modulator detects a negative current flowing through the high-side switch during a light load condition. When the negative current is detected, the active current modulator is operable to maintain the high-side switch "on" in a linear mode and to limit the negative current to a predetermined current level.

6 Claims, 5 Drawing Sheets

METHOD AND APPARATUS FOR SYNCHRONOUS BOOST VOLTAGE REGULATORS WITH ACTIVE NEGATIVE CURRENT MODULATION

TECHNICAL FIELD

The present invention relates generally to the field of analog integrated circuits. More specifically, the present invention relates to switch-mode voltage regulators.

BACKGROUND

In a conventional switch-mode synchronous boost voltage regulator, under light load or no load conditions, the conduction state of the high-side switch may be long enough for the inductor current ($I_L$) to decay to zero and starts to reverse. This reverse inductor current ($I_L$) will generate additional voltage stress across the low-side transistor switch during the transition to and from the dead times because of the voltage drop in the body diode of the low-side switch and the voltage spikes caused by parasitic components. As a result, the higher the negative inductor current ($I_L$), the higher the voltage stresses. Thus, it is desirable to prevent excessive voltage stress by limiting the negative inductor current ($I_L$) in a switch-mode synchronous boost voltage regulator.

Furthermore, the turning off of the high-side transistor switch will cause high frequency oscillation at the switch node due to parasitic elements. Usually this oscillation frequency is much higher than the switching frequency. As a result, the output may see high frequency ripples, resulting in electromagnetic interference (EMI) that adversely affects the performance of the whole circuit. In prior arts, passive RC snubber is used to suppress the ringing. Although this prior-art method is effective, the RC snubber seem to have significantly reduced power efficiency.

BRIEF DESCRIPTION OF THE DRAWINGS

The accompanying drawings, which are incorporated in and from a part of this specification, illustrate embodiments of the invention and, together with the description serve to explain the principles of the invention.

DETAILED DESCRIPTION

Reference will now be made in detail to different embodiments of the invention, examples of which are illustrated in the accompanying drawings. While the invention will be described in conjunction with different embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
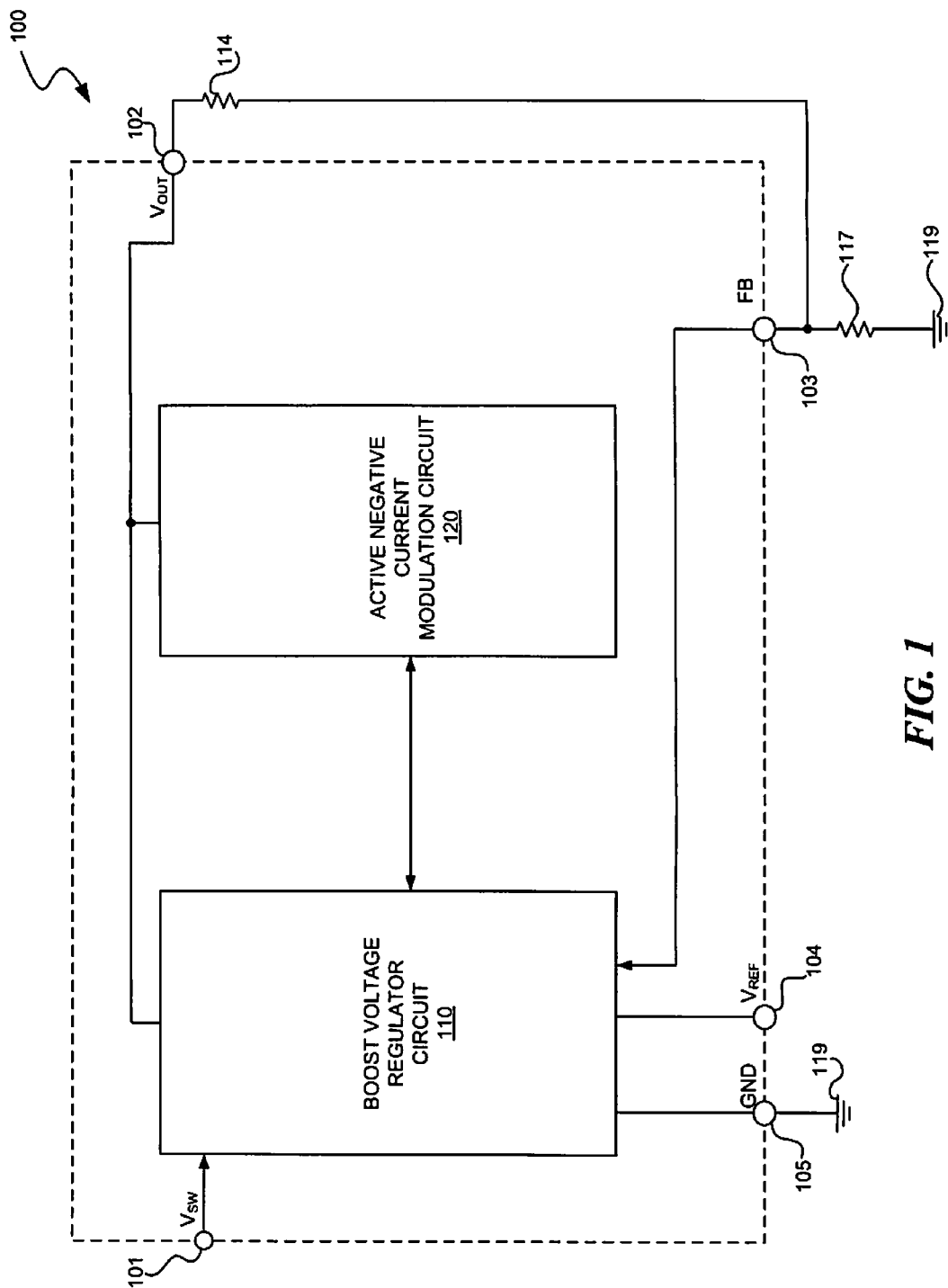
FIG. 1 illustrates a block diagram of a switch-mode boost voltage regulator integrated circuit having an active negative current modulation circuit electrically coupled to a boost voltage regulator circuit in accordance with an embodiment of the present invention.

Referring now to FIG. 1, a block diagram of a switch-mode synchronous boost regulator integrated circuit 100 is shown in accordance with an embodiment of the present invention. Switch-mode synchronous boost voltage regulator integrated circuit 100 includes a boost voltage regulator circuit 110 and an active negative current modulation circuit 120. In one embodiment, switch-mode boost voltage regulator integrated circuit 100 may be in form of an integrated circuit package (IC) having a switch node (SW) pin 101, an output pin 102, a feedback pin 103, a voltage reference pin 104, and a ground pin 105. Output pin 102 is where an output voltage ($V_{OUT}$) is drawn. Also, at output pin 102, a sample of output voltage ($V_{OUT}$) is fed back via resistors 114 and 117 to regulate boost voltage regulator circuit 110. In one embodiment, a voltage reference ($V_{REF}$) can be set internally inside synchronous boost voltage regulator integrated circuit 100. Active negative current modulation circuit 120, electrically coupled to boost voltage regulator circuit 110, is operable to detect a negative current during a light load condition so as to cause a high-side switch to turn on and operate in a linear mode and to limit the negative current to a predetermined current level. It is noted that the term "light load condition" used in this application to mean both low load and no load conditions. It is also noted that switch-mode boost voltage regulator integrated circuit 100 may include other pins such as enable pin (not shown), and supply power pin (not shown), etc., which are within the scope of the present invention.

Figure 2:
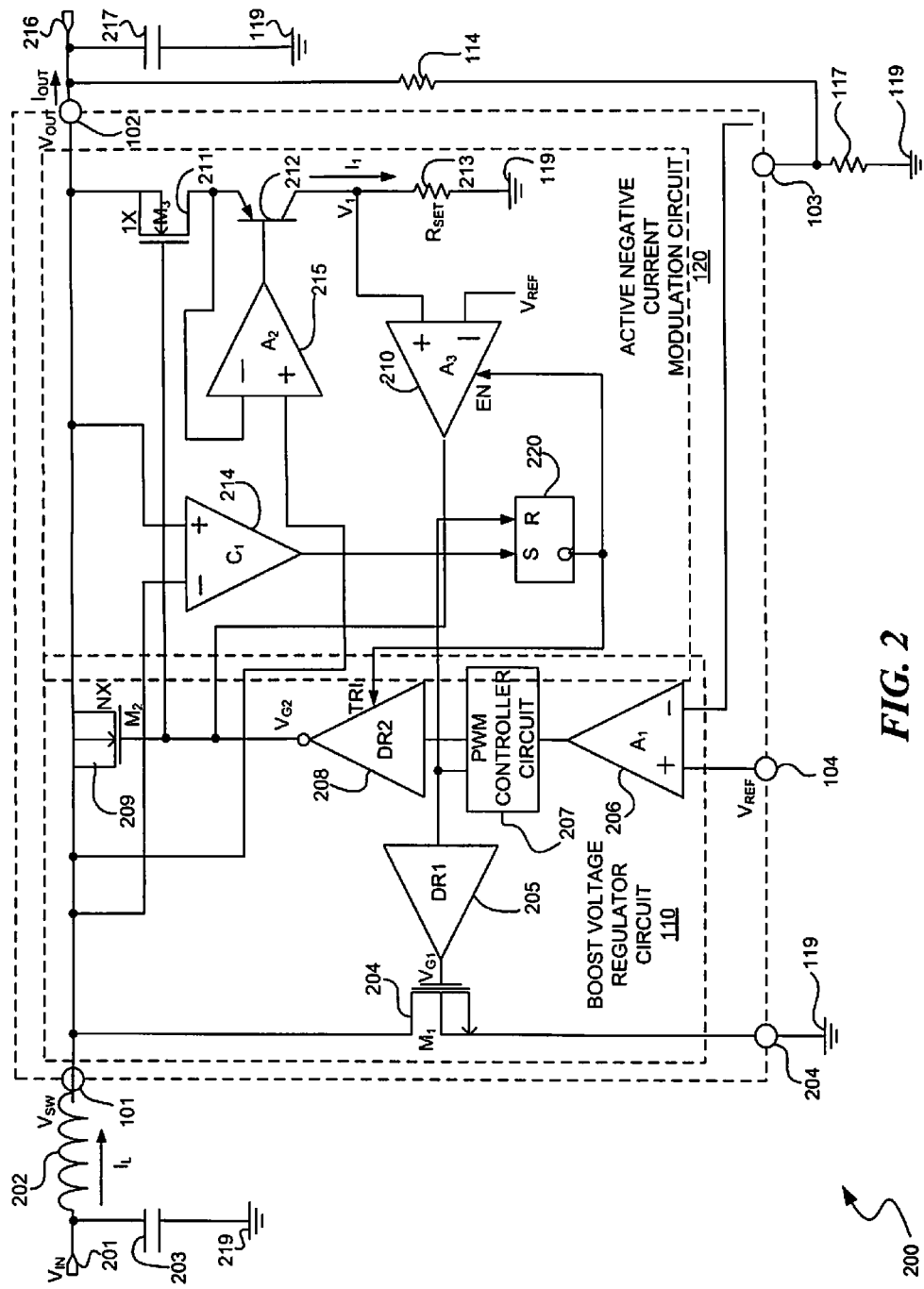
FIG. 2 illustrates a detailed schematic diagram of a switch-mode boost voltage regulator integrated circuit (IC) having an active negative current modulation circuit of FIG. 1 in accordance with an embodiment of the present invention.

Turning now to FIG. 2, there is shown an embodiment of a switch-mode synchronous boost voltage regulator integrated circuit 200. In this embodiment, switch-mode synchronous boost voltage regulator integrated circuit 200 is connected to an inductor 202 at switch node (SW) pin 101. Inductor 202 and capacitor 203 are connected together and to an input terminal 201 where an unregulated input voltage ($V_{IN}$) is received. The other terminal of capacitor 203 is connected to an electrical ground 119 while the other terminal of inductor 202 is connected to switch node (SW) pin 101.

In boost voltage regulator circuit 110, low-side n-channel Metal Oxide Semiconductor (nMOS) transistor switch 204 (hereinafter referred to as "low-side nMOS transistor switch ($M_1$) 204") is connected to a high-side p-channel Metal Oxide Semiconductor (pMOS) transistor switch ($M_2$) 209 (hereinafter referred to as "high-side pMOS transistor switch ($M_2$) 209"). More particularly, the drain terminal of low-side nMOS transistor switch ($M_1$) 204 is connected to inductor 202 and to the drain terminal of pMOS high-side transistor switch ($M_2$) 209. The source/body terminal of low-side nMOS transistor switch (M$_1$) 204 is connected to electrical ground 119 at ground pin 105. The source/body terminal of high-side pMOS switch transistor (M$_2$) 209 is connected to output pin 102 and to an output capacitor (C$_{OUT}$) 217. The other terminal of output capacitor (C$_{OUT}$) 217 is coupled to electrical ground 119.

A first gate driver circuit (DR1) 205 is connected to drive the gate of low-side nMOS transistor switch (M$_1$) 204. A second gate driver circuit (DR2) 208 is connected to drive the gate of high-side pMOS transistor switch (M$_2$) 209. A Pulse Width Modulation (PWM) controller circuit 207 drives both first gate driver circuit (DR1) 205 and second gate driver (DR2) circuit 207. In turn, PWM controller circuit 207 is driven by a first error amplifier (A$_1$) 206. The non-inverting terminal of first error amplifier (A$_1$) 206 receives a reference voltage (V$_{REF}$), the inverting terminal is connected to feedback pin 103 and output pin 102 via first resistor 114 and second resistor 117. The second terminal of resistor 114 is connected to output pin 102 and to output capacitor 217. The other terminal of resistor 117 is connected to electrical ground 119.

Referring again to FIG. 2, in active negative modulation circuit 120, there is a first comparator circuit (C$_1$) 214 having a inverting terminal connected to the drain terminal and a non-inverting terminal connected to the source/body terminal of high-side pMOS transistor switch (M$_2$) 209. The output terminal of first comparator circuit (C$_1$) 214 is coupled to control second gate driver circuit (DR2) 208. In one embodiment, the control of second gate driver circuit (DR2) 208 is implemented by a SR flip flop circuit 220 having a set input (S) connected to the output of first comparator circuit (C$_1$) 214, a reset input (R) connected to PWM controller circuit 207 and to the input terminal of first gate driver circuit (DR1) 205. In turn, an output (Q) of SR flip flop circuit 220 is connected to second gate driver circuit (DR2) 208. The reset input (R) is dominant in comparison to the set input (S).

Continuing with FIG. 2, a p-channel Metal Oxide Semiconductor (pMOS) transistor ("pMOS transistor (M$_3$)") 211 is electrically coupled to high-side pMOS transistor switch (M$_2$) 209 to form a current mirror circuit. More particularly, the gate terminal of pMOS transistor (M$_3$) 211 is connected to the gate of high-side pMOS transistor switch (M$_2$) 209 and their source/body terminals are connected together, thus forming a mirror circuit. In one embodiment, pMOS transistor (M$_3$) 211 is fabricated so that it is N times smaller than high-side pMOS transistor switch (M$_2$) 209. Accordingly, the current that flows through high-side pMOS transistor switch (M$_2$) 209 is N times larger than that of pMOS transistor (M$_3$) 211. A second error amplifier circuit (A$_2$) 215 and a pnp Bipolar Junction Transistor ("pnp BJT transistor") 212 are electrically coupled to ensure that the drain source voltage (V$_{DS}$) of pMOS transistor (M$_3$) 211 is the same as that of high-side pMOS transistor (M$_2$) 209. That is, the non-inverting terminal of second error amplifier circuit (A$_2$) 215 is electrically connected to the drain terminal of high-side pMOS switch transistor (M$_2$) 209. Its inverting terminal is connected to the drain terminal of pMOS transistor (M$_3$) 211 and to the emitter terminal of pnp BJT transistor 212. The output terminal of second error amplifier circuit (A$_2$) 215 is connected to drive the base of pnp BJT transistor 212.

A third error amplifier circuit (A$_3$) 210 is used to control the gate of pMOS transistor (M$_3$) 211 to modulate the current flowing therethrough. The non-inverting terminal of third error amplifier (A$_3$) 210 is connected to the collector of pnp BJT transistor 212 and to a setting resistor (R$_{SET}$) 213. The emitter of pnp BJT transistor 212 is connected to the drain of pMOS transistor (M$_3$) 211. The second terminal of setting resistor (R$_{SET}$) 213 is connected to electrical ground 119. Pnp BJT transistor 212 passes the current of PMOS transistor (M$_3$) 211 to resistor (R$_{SET}$) 213. The inverting terminal of third error amplifier (A$_3$) 210 is connected to the reference voltage (V$_{REF}$). Finally, the Enable terminal of third error amplifier (A$_3$) 210 is connected to the output (Q) of SR flip flop circuit 220.

If a negative current is detected causing the switch voltage (V$_{SW}$) at switch node (SW) pin 101 to drop below the output voltage (V$_{OUT}$), first comparator circuit (C$_1$) 214 senses the change in polarities of the drain-source voltage (V$_{DS}$) of high-side pMOS transistor switch (M$_2$) 202 and goes HIGH to set SR flip flop circuit 220. Thus, output (Q) goes HIGH that puts second gate driver circuit (DR2) 208 in an output TRI state or high impedance output. As a result, second gate driver circuit (DR2) 208 does not drive high-side pMOS transistor switch (M$_2$) 209 on and off. The gate of high-side pMOS transistor switch (M$_2$) 209 is now ON and linearly controlled by the output of third error amplifier (A$_3$) 210 which was enabled by SR flip flop circuit 220. In the next switching cycle, when low-side nMOS transistor switch (M$_1$) 204 is turned ON again, PWM controller circuit 207 resets SR flip-flop 220, thus output (Q) now going LOW. As a result, second gate driver circuit (DR2) 208 is not in high-impedance state and resumed to drive the gate of the high-side pMOS transistor switch (M$_2$) 209. At that moment, third error amplifier (A$_3$) 210 is again disabled.

Figure 3A:
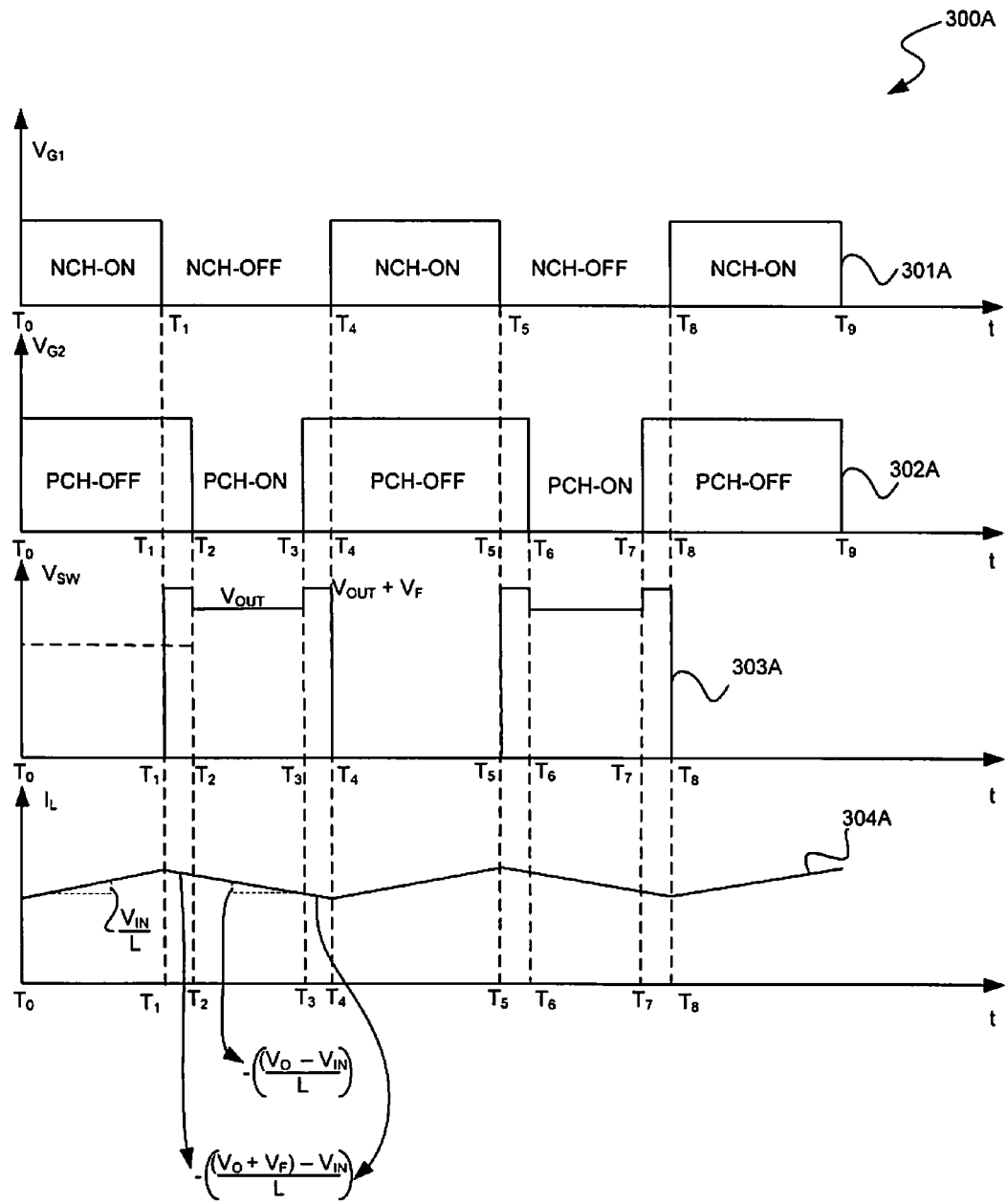
FIG. 3A illustrates voltage and current waveforms of the switch-node boost voltage regulator integrated circuit of FIG. 2 during the heavy load condition when the inductor current is positive and the active negative current modulation circuit is not activated.

The operation of switch-mode synchronous boost voltage regulator integrated circuit 200 is explained in connection with FIG. 3A and FIG. 3B as follows. Referring now to FIG. 3A, a series of waveforms 300A representing the operation of switch-mode synchronous boost voltage integrated circuit 200 in normal operation (or in heavy load condition) are shown. A voltage waveform 301A that represents a first gate drive voltage (V$_{G1}$) is input into the gate of low-side nMOS transistor switch (M$_1$) 204. A voltage waveform 302A that represents a second gate drive voltage (V$_{G2}$) is input into the gate of high-side pMOS transistor switch (M$_2$) 209. PWM controller circuit 207 is operative to control the on-time duration of waveform 301A and waveform 302A in such a manner that either high-side pMOS transistor switch (M$_2$) 209 or low-side transistor switch (M$_1$) 204 is made sure to be turned off before the other one is turned on. This is to avoid the shoot-through problem when both low-side nMOS transistor switch (M$_1$) 204 and high-side pMOS transistor switch (M$_2$) 209 are both ON. Thus, T$_1$-T$_2$, T$_3$-T$_4$, T$_5$-T$_6$, and T$_7$-T$_8$ are dead times during which both low-side nMOS transistor switch (M$_1$) 204 and high-side pMOS transistor switch (M$_2$) 209 are OFF regardless of whether output capacitance (C$_{OUT}$) 217 maintains a regulated output voltage (V$_{OUT}$) or not.

From T$_0$ to T$_1$, when waveform 301A is HIGH, low-side nMOS switch transistor (M$_1$) 204 is turned ON. At the same time waveform 302A is also HIGH, high-side pMOS switch transistor (M$_2$) 209 is turned OFF. As a result, switch node (SW) pin 101 is connected to electrical ground 119. This is illustrated by a waveform 303A representing the switch node voltage (V$_{SW}$) at switch node pin (SW). The slope of the inductor current (I$_L$) is $$\frac{dI_L}{dt} = \frac{V_{IN}}{L},$$

which is shown in a waveform 304A representing the inductor current (I$_L$).

From $T_1$ to $T_2$, during dead-time, when both low-side nMOS transistor switch ($M_1$) 204 and high-side pMOS transistor switch ($M_2$) 209 are OFF, the voltage at switch node (SW) 101 is now isolated from electrical ground 119 and connected to output input voltage ($V_{OUT}$) by the body diode (not shown) of high-side pMOS transistor switch ($M_2$) 209. This is because the voltage at switch node (SW) pin 101 turns on the body diode of high-side pMOS transistor switch ($M_2$) 209. The voltage at switch node (SW) pin 101 is the sum of output voltage ($V_{OUT}$) plus a forward voltage ($V_F$) of a body diode. Equivalently, from $T_1$ to $T_2$, $V_{SW} = V_{OUT} + V_F$. The slope of waveform 304A representing inductor current ($I_L$) is:

$$\frac{dI_L}{dt} = -\left(\frac{(V_O + V_F) - V_{IN}}{L}\right).$$

From $T_2$ to $T_3$, both first gate drive voltage ($V_{G1}$) and second gate drive voltage ($V_{G2}$) are LOW. This results in low-side nMOS transistor switch ($M_1$) 204 is turned OFF while high-side pMOS transistor switch ($M_2$) 209 is turned ON. Consequently, switch node (SW) pin 101 now connected to output terminal 116, waveform 303A representing switch-node voltage ($V_{SW}$) is now dropped to the output voltage level ($V_{OUT}$). Therefore, the slope of the inductor current from $T_2$ to $T_3$ is:

$$\frac{dI_L}{dt} = -\left(\frac{V_O - V_{IN}}{L}\right).$$

From, $T_3$ to $T_4$, switch-mode synchronous synchronous voltage regulator integrated circuit 200 enters a second dead time. Accordingly, low-side nMOS transistor switch ($M_1$) 204 and high-side pMOS transistor switch ($M_2$) 209 are both turned OFF. During this period, switch node (SW) pin 101 is connected to output pin 102 by the conduction of the body diode (not shown) of high-side pMOS transistor switch ($M_2$) 209. As such, waveform 303A increases to the output voltage ($V_{OUT}$) plus a forward drop ($V_F$) of the body diode. Again, $V_{SW} = V_{OUT} + V_F$ until $T_4$. Thus, the inductor current ($I_L$) continues to decrease from $T_3$ to $T_4$ at a rate equal to $$\frac{dI_L}{dt} = -\left(\frac{V_{OUT} + V_F - V_{IN}}{L}\right).$$

In the following switching cycle, from $T_4$ on, the waveforms 300A repeat as shown in FIG. 3A.

During the heavy load condition, because inductor current ($I_L$) is positive and flowing from switch node (SW) pin 101 to output pin 102, comparator circuit ($C_1$) 214 issues a LOW output signal at the set input (S) of SR flip flop circuit 220. Accordingly, SR flip flop circuit 220 is not set and its output (Q) is LOW which does not enable third error amplifier ($A_3$). Consequently, third error amplifier ($A_3$) 210 does not interfere with the operation of second gate driver circuit (DR2) 208. In another word, boost voltage regulator circuit 110 substantially controls the operation of switch-mode synchronous voltage regulator integrated circuit 200.

Figure 3B:
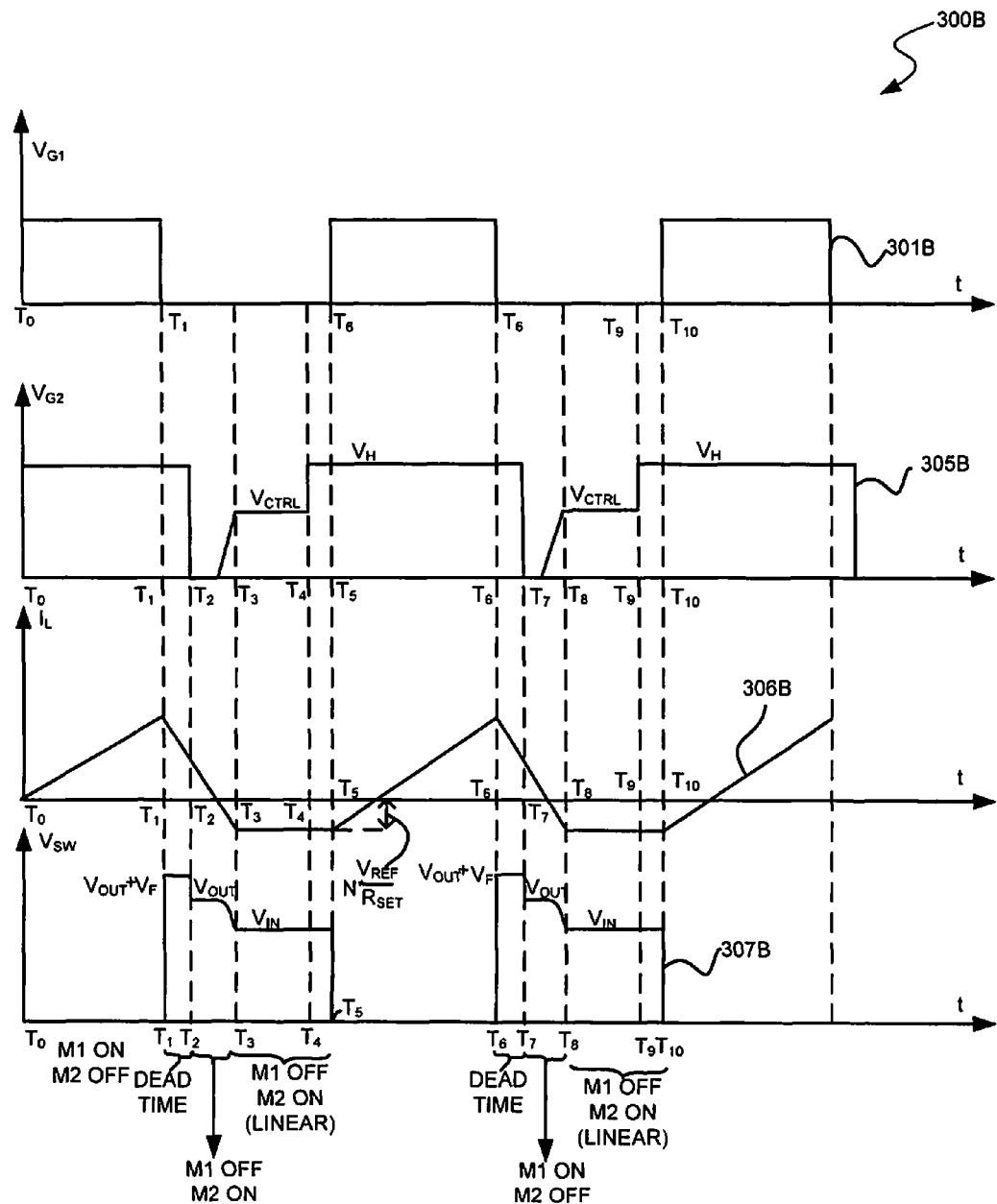
FIG. 3B illustrates voltage and current waveforms of the switch-mode boost voltage regulator integrated circuit of FIG. 2 in the light load condition when the inductor current becomes negative and the active negative current modulation circuit is activated.

Now referring to FIG. 3B, FIG. 3B illustrates the operation of switch-mode synchronous boost voltage regulator integrated circuit 200 during light load or no load and when active negative current modulation circuit 120 is activated to limit the negative current flowing through high-side pMOS transistor switch ($M_2$) 209. During the light load condition, low-side nMOS transistor switch ($M_1$) 204 and high-side pMOS transistor switch ($M_2$) 209 continue to be toggled ON and OFF alternately until a negative current is detected. This is represented by a waveform 301B that represents first gate drive voltage ($V_{G1}$) and by a waveform 302B representing second gate drive voltage ($V_{G2}$). In this context, waveform 202B representing second gate drive voltage ($V_{G2}$) is different from that of FIG. 3A because second gate drive voltage ($V_{G2}$) is now modulated by active negative current modulation circuit 120.

From $T_0$ to $T_1$, the first gate drive voltage ($V_{G1}$) is HIGH and second gate drive voltage ($V_{G2}$) is also HIGH. Referring back to FIG. 2, low-side nMOS transistor switch 204 is ON, connecting switch node (SW) pin 101 to electrical ground 119. Thus, the voltage ($V_{SW}$) at switch node pin (SW) 101 is LOW. This is shown in a waveform 307B.

From $T_1$ to $T_2$, switch-mode synchronous boost voltage regulator integrated circuit 200 enters to a dead time to avoid shoot-through problems. Both low-side nMOS transistor switch ($M_1$) 204 and high-side PMOS transistor switch ($M_2$) 209 are turned OFF. However, the body diode (not shown) of high-side pMOS transistor switch ($M_2$) 209 is turned ON because the free wheeling current in inductor (L) 202 starts to reverse direction. Thus, the switch node (SW) pin 101 is connected to output pin 102 and jumps to a voltage that equals to the output voltage ($V_{OUT}$) plus a forward drop ($V_F$) of the body diode. Thus, $V_{SW} = V_{OUT} + V_F$.

From $T_2$ to $T_3$, when first drive voltage ($V_{G1}$) and second drive voltage ($V_{G2}$) are both LOW, low-side nMOS switch ($M_1$) 204 is OFF and high-side switch ($M_2$) 209 is ON. Switch node (SW) pin 101 is connected to output voltage ($V_{OUT}$). Thus, switch voltage ($V_{SW}$) decreases from $V_{OUT} + V_F$ to $V_{OUT}$ as shown in waveform 307B. Thus, the current flowing through high-side PMOS transistor switch ($M_2$) 209 is decreasing until crossing the zero line to become negative current. At that moment, comparator circuit ($C_1$) 214 detects a change in polarities of the drain-source ($V_{DS}$) of high-side pMOS ($M_2$) transistor switch 209 and issues a HIGH output signal to the input (S) of SR flip flop circuit 220. This sets SR flip flop circuit 220 and thus output (Q) goes HIGH. Second gate drive circuit (DR2) 208 is now put in a tri-state or a high-impedance output state. At that moment, third error amplifier circuit ($A_3$) 210 is now enabled to limit the negative current to a preset value equal to $$N \times \frac{V_{REF}}{R_{SET}}.$$

This is shown in the plateau region starting from $T_3$ in waveform 306B. As a result of this current regulation by third error amplifier circuit ($A_3$) 210, second gate drive voltage ($V_{G2}$) increases to a control level ($V_{CTRL}$), which is shown in waveform 305B.

From $T_3$ to $T_4$, as high-side pMOS transistor switch ($M_2$) 209 is ON and operated in the linear mode to draw a negative current of $$N \times \frac{V_{REF}}{R_{SET}}.$$

During this time period, switch node ($V_{SW}$) is isolated from both electrical ground 119 and output pin 102. Thus, switch voltage ($V_{SW}$) decays to input voltage ($V_{IN}$).

From $T_4$ to $T_5$, both low-side nMOS transistor switch ($M_1$) 204 and high-side pMOS transistor switch ($M_2$) 209 are OFF during this dead time period.

From $T_5$ to $T_6$, low-side nMOS transistor switch ($M_1$) 204 is turned on again. PWM controller circuit 207 resets SR flip flop circuit 220. As such, the output Q of SR flip flop circuit 220 goes LOW, releasing second gate driver circuit (DR2) 208 from its tri-state and disabling third error amplifier ($A_3$) 210. As a consequence, third error amplifier ($A_3$) 210 ceases to control the gate of pMOS transistor ($M_3$) 211. A corollary of this is that active negative current modulation circuit 120 releases the control of switch-mode synchronous boost integrated circuit 200 and boost voltage regulator circuit 110 takes over.

In the following switching cycles, from $T_6$ on, waveforms 300B repeat as shown in FIG. 3B.

Figure 4:
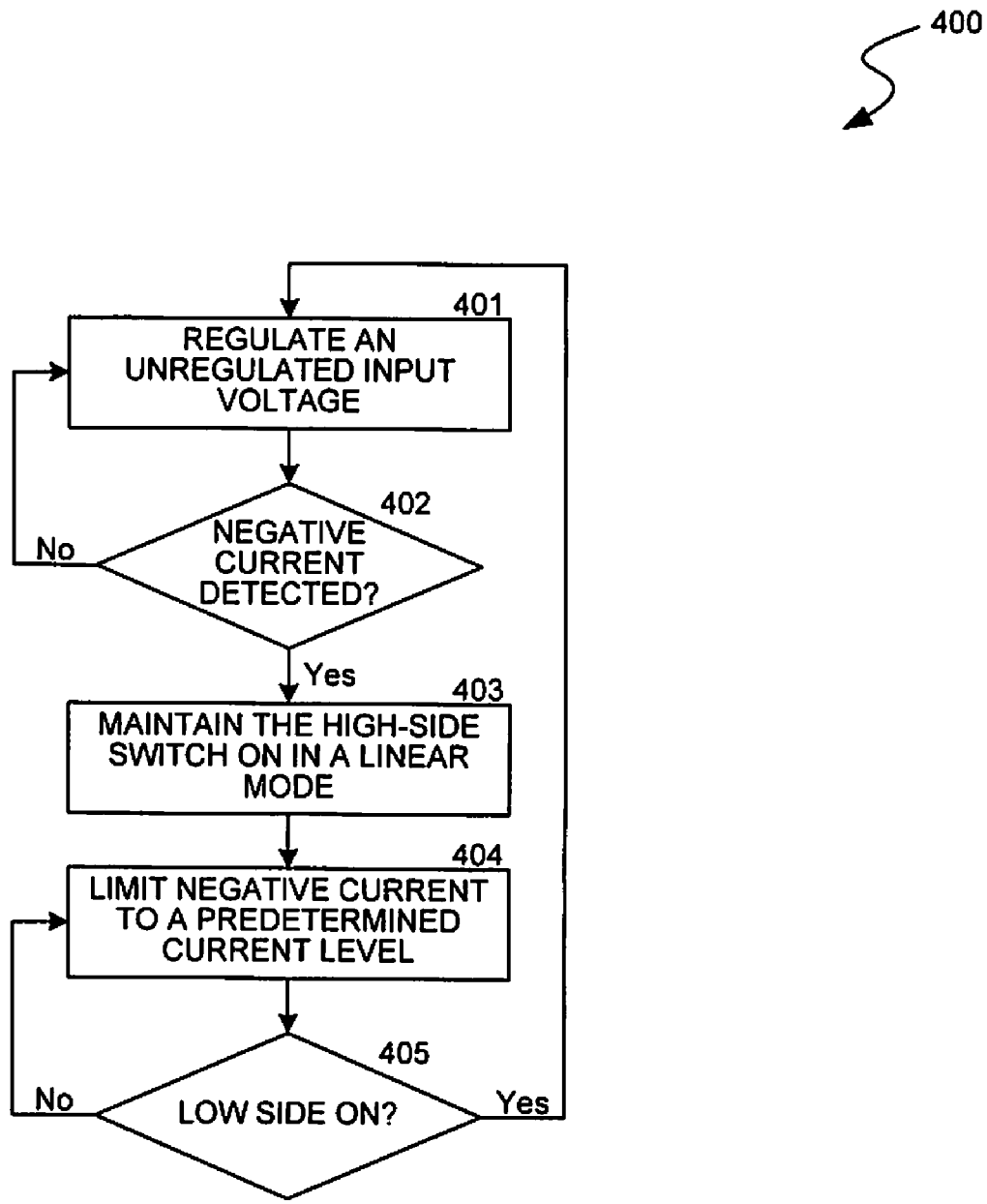
FIG. 4 illustrates a flow chart of a method of controlling a switch-mode boost voltage regulator integrated circuit (IC) in accordance with an embodiment of the present invention.

Now referring to FIG. 4, a flow chart 400 illustrating a method of controlling a negative current in a synchronous boost regulator circuit that includes the steps of: regulating an unregulated input voltage, detecting for negative current, when inductor negative current is detected, causing the high-side switch to operate in the linear mode, and limiting the negative current to a predetermined current level. If the negative current is not detected, continue to operate the boost voltage regulator in an usual manner. Finally, the method also includes a step of determining whether the low-side switch is turned ON again. If the low-side switch is turned on, regulating the input voltage as normal. Otherwise, continue to limit the inductor current at the predetermined current level.

Now referring to step 401, an input voltage is regulated. An unregulated input voltage ($V_{IN}$) is received and regulated to generate an output voltage. In one embodiment, a switch-mode boost voltage regulation is used. Step 401 is implemented by boost voltage regulator circuit 110 that receives an input voltage ($V_{IN}$) at switch node pin 101 and generates a regulated output voltage ($V_{OUT}$) at output pin ($V_{OUT}$) 102. More particularly, step 401 is implemented using a low-side nMOS transistor switch ($M_1$) 204 driven by first gate driver circuit (DR1) 205, high-side pMOS transistor switch ($M_2$) 209 driven by a second gate driver circuit 208. Both gate driver circuits 205 and 208 are controlled by PWM controller circuit 207 and a comparator circuit ($C_1$) 206.

Referring next to step 402, a negative current is monitored. Inductor current ($I_L$) is constantly monitored for light mode operation in which the inductor current crosses zero line and becomes negative. Step 402 is implemented by comparator circuit ($C_1$) 214 coupled across high-side pMOS transistor switch ($M_2$) 209. The detail operation of the manner comparator circuit ($C_1$) 214 detects the reverse in polarities of the drain-source voltage ($V_{DS}$) of high-side pMOS transistor switch 209 is described above.

Referring to step 403, the high-side switch is driven in a linear mode if a negative current is detected. Step 403 further includes step of causing the gate driver circuit of the high-side switch to be in a tri-state or high-impedance output state. This step is implemented by comparator circuit ($C_1$) 214 and SR flip flop circuit 220.

Following step 403 is a step 404, after the negative current is detected, it is limited to a predetermined current level. Step 404 is implemented by active negative current modulation circuit 120 shown in FIG. 1 and FIG. 2. More particularly, step 404 is implemented by the current mirror circuit configured by comparator circuit ($C_1$) 214, second error amplifier ($A_2$) 215, third error amplifier ($A_3$) 210, pMOS transistor ($M_3$) 211, pnp BJT transistor 212, and setting resistor ($R_{SET}$) 213. The operation of this portion of active negative current modulation circuit 120 in implementing step 404 is described in details above.

Finally, referring to step 405, it is determined whether the low-side switch is turned on. Whenever the low-side switch is turned back ON in the next switching cycle, normal regulation is returned, i.e., the inductor current is not controlled anymore. If the low-side switch is not turned back on, the method continues to limit the negative current. Step 405 is implemented by active negative current modulation circuit 120 of the present invention. More particularly, when low-side nMOS transistor switch (M1) 204 is turned ON again, the reset of SR flip flop circuit 220 is released. Thus, comparator circuit ($C_1$) 214 continues to detect negative current, and the control of switch-mode boost voltage regulator integrated circuit 200 is again yielded to boost voltage regulator circuit 110. However, if low-side nMOS transistor switch ($M_1$) 204 is not turned on, the set of SR flip flop circuit 220 is still maintained. As a result, active negative current modulation circuit 120 is still controlling and the negative current is continued to be limited at the predetermined value, which is $$N \times \frac{V_{REF}}{R_{SET}}.$$

Many modifications and variations of the present invention are possible in light of the above teachings. It is therefore to be understood that within the scope of the appended claims the invention may be practiced otherwise than as specifically described. It should be understood, of course, the foregoing disclosure relates only to an embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only an embodiment(s) thereof has been disclosed.

I claim:

1. A circuit comprising:
a boost voltage regulator including a low-side switch and a high-side switch, the boost voltage regulator operable to generate a stabilized output voltage that is greater than an input voltage; and
an active current modulator electrically coupled to detect a negative current flowing through said high-side switch during a light load condition, wherein when said negative current flow is detected, said active current modulator is activated to maintain said high-side switch in an on state in a linear mode and to limit said negative current flow to a predetermined current level,
wherein said active current modulator further comprises;
a comparator circuit electrically coupled to said high-side switch, operable to detect said negative current; and
a current mirror circuit, electrically coupled to said comparator circuit and to said boost voltage regulator circuit, operable to force said negative current to be in a predetermined relation to said predetermined current level.

2. The circuit of claim 1 wherein said current mirror circuit further comprises a p-type Metal Oxide Semiconductor (pMOS) transistor electrically coupled to said high-side pMOS transistor switch.

3. The circuit of claim 2 wherein said comparator circuit further comprises a non-inverting input terminal, an inverting input terminal, and an output terminal, the inverting input terminal electrically coupled to the source of said pMOS transistor switch, the non-inverting input terminal electrically coupled to the drain of said pMOS transistor switch and to said inductor.

4. The circuit of claim 3 wherein said pMOS transistor is configured to be substantially smaller in size than said pMOS transistor switch.

5. The circuit of claim 4 wherein said current mirror circuit further comprises:
- a second error amplifier circuit electrically coupled to said pMOS transistor switch;
- a third error amplifier circuit electrically coupled to a second reference voltage and to said pMOS transistor switch; and
- an SR flip flop circuit electrically coupled to said first gate driver circuit, said comparator circuit, and said third error amplifier circuit.

6. The circuit of claim 1 wherein said current mirror circuit further comprises:
- a pnp bipolar junction transistor electrically coupled to said second error amplifier circuit and to said pMOS transistor switch; and
- an output resistor electrically coupled to said pnp bipolar junction transistor and to an electrical ground.

* * * * *